(12) United States Patent
Brummel et al.

(10) Patent No.: US 7,708,461 B2
(45) Date of Patent: May 4, 2010

(54) TEMPERATURE DETERMINATION OF AN AWAY-FACING SURFACE OF AN OBJECT

(75) Inventors: Hans-Gerd Brummel, Berlin (DE); Uwe Linnert, Fürth (DE); Klaus Newerla, Nürnberg (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 102 days.

(21) Appl. No.: 11/663,153

(22) PCT Filed: Sep. 16, 2005

(86) PCT No.: PCT/EP2005/054607

§ 371 (c)(1),
(2), (4) Date: Mar. 19, 2007

(87) PCT Pub. No.: WO2006/030025

PCT Pub. Date: Mar. 23, 2006

(65) Prior Publication Data

US 2008/0107150 A1   May 8, 2008

(30) Foreign Application Priority Data

Sep. 17, 2004 (KR) .................. 10 2004 045 198
Sep. 1, 2005 (KR) .................. 10 2005 041 722

(51) Int. Cl.
*G01K 11/24* (2006.01)
(52) U.S. Cl. .............................. 374/119; 374/141
(58) Field of Classification Search ............... 374/119, 374/141
See application file for complete search history.

(56) References Cited

U.S. PATENT DOCUMENTS

| 5,604,592 | A | * | 2/1997 | Kotidis et al. | 356/493 |
| 5,951,163 | A | * | 9/1999 | Jen et al. | 374/119 |
| 6,026,688 | A | * | 2/2000 | Khuri-Yakub et al. | 73/597 |
| 6,786,633 | B2 | * | 9/2004 | Wallen et al. | 374/117 |
| 6,837,109 | B2 | * | 1/2005 | Okuno et al. | 73/597 |
| 7,470,056 | B2 | * | 12/2008 | Yuhas | 374/7 |

(Continued)

FOREIGN PATENT DOCUMENTS

EP   0 113 961 A1   7/1984

(Continued)

*Primary Examiner*—Gail Verbitsky
*Assistant Examiner*—Mirellys Jagan
(74) *Attorney, Agent, or Firm*—Staas & Halsey LLP

(57) ABSTRACT

A method for determining the temperature of an away-facing surface of an object, wherein at least one ultrasonic pulse is transmitted through a surface of the object facing a transmitter/receiver unit into said object; the at least one ultrasonic pulse is reflected at least partially in the direction of the transmitter/receiver unit on the surface of the object facing away from the transmitter/receiver unit; and the reflected part of the at least one transmitted ultrasonic pulse is received by the transmitter/receiver unit. At least one temperature value for the object surface facing the transmitter/receiver unit is also determined; at least one value is determined for the propagation time of the at least one ultrasonic pulse through the object, and at least one temperature value for the object surface facing away from the transmitter/receiver unit is determined by the at least one temperature value for the object surface facing the transmitter/receiver unit and the at least one propagation time value.

9 Claims, 2 Drawing Sheets

U.S. PATENT DOCUMENTS

2003/0029242 A1    2/2003    Yaralioglu et al.
2004/0082069 A1*   4/2004    Jiang et al. .................... 436/2

FOREIGN PATENT DOCUMENTS

| | | | |
|---|---|---|---|
| EP | 1 231 456 A1 | 8/2002 | |
| FR | 1 562 549 A1 | 4/1969 | |
| JP | 60035231 A | * | 2/1985 |
| JP | 2003-042857 A | 2/2003 | |

* cited by examiner

TEMPERATURE DETERMINATION OF AN AWAY-FACING SURFACE OF AN OBJECT

CROSS REFERENCE TO RELATED APPLICATIONS

This application is based on and hereby claims priority to Application No. PCT/EP2005/054607 filed on Sep. 16, 2005, DE Application No. 10 2004 045 198.2 filed on Sep. 17, 2004 and DE Application NO. 10 2005 041 722.1 filed on Sep. 1, 2005, the contents of which are hereby incorporated by reference.

BACKGROUND

The invention relates to a method and a measurement device for determining the temperature of an away-facing surface of an object and to a use of the method and a use of the measurement device. A corresponding method and a corresponding device for temperature determination by ultrasound may be gathered from JP 2003042857 A.

Turbomachines, such as, for example, steam or gas turbines, are used as thermal engines in industry in order to convert an energy stored in a gas stream into a mechanical energy, particularly into a rotational movement. Furthermore, turbomachines, such as compressors, by which mechanical energy can be supplied to a gas stream, also come under consideration. In order, in gas turbines, to achieve as high an overall efficiency as possible in terms of energy utilization, the selected gas inlet temperatures from the combustion chamber into the flow duct of the gas turbine are as high as possible. For example, the gas inlet temperatures lie above 1000° C.

This makes it necessary, under these high physical loads, for the turbomachine to be kept under observation during operation. In this case, in particular, temperature measurement within the turbomachine delivers important information on the state of the turbomachine. For this purpose, as a rule, measuring probes mounted in the turbomachine are used, the signal and supply lines of which lead outward through the wall of the turbomachine by leadthroughs. A large number of temperature measurement points therefore require a large number of leadthroughs and seals. Under the high physical loads, these always constitute fault sources which must be avoided as far as possible in order to ensure that the turbomachine operates reliably.

JP 2003042857 A specifies a method and a device, by which the temperature of a wall surface which faces away from the device and is in contact with a liquid and, consequently, the temperature of the liquid can be measured by ultrasound. In this case, ultrasonic waves are irradiated through the wall surface facing the device into the wall and are reflected on the surface facing away. The ratio of the amplitudes of the ultrasonic waves before and after reflection on the away-facing surface which is in contact with the liquid depends in this case on the acoustic reflection factor of the surface, which is determined, in turn, by the acoustic impedance of the liquid. Since the acoustic impedance of the liquid is temperature-dependent, the temperature of the liquid can ultimately be determined from the determination and evaluation of the reflection-induced amplitude decrease of the ultrasonic radiation. To determine the amplitude decrease, the amplitude peak values are measured, although these are overlaid with interference signals and noise. It is therefore scarcely possible to determine the amplitude decrease exactly after only one reflection. For this reason, the amplitude decrease of ultrasonic waves which are multiply reflected from the two surfaces standing opposite one another is investigated. However, where relatively thick walls are concerned, this cannot be carried out, since the amplitudes of the ultrasonic waves, which also experience damping when they run through the wall, are excessively attenuated after multiple reflection and are therefore no longer measurable. Moreover, the method and the device require a liquid which is in contact with the wall and by which the reflection factor can be noticeably influenced. By contrast, where gases are concerned, a temperature-dependent change in the reflection factor is no longer measurable, since, because of the very high reflection factor of approximately 1, its slight change is no longer detectable unequivocally, particularly in the background interference.

SUMMARY

One possible object of the invention is based, then, is to specify a method and a measurement device, by which a temperature determination which as simple and as reliable as possible and is more exact, as compared with the related art, and is employable more universally can be made possible.

The inventors propose a method for determining the temperature of an away-facing surface of an object, in which a) at least one ultrasonic pulse is transmitted by a transmission/reception unit through a surface of the object which faces the transmission/reception unit into the object, b) the at least one ultrasonic pulse is at least partially reflected in the direction of the transmission/reception unit on the object surface facing away from the transmission/reception unit, and c) the reflected fraction of the at least one transmitted ultrasonic pulse is received by the transmission/reception unit.

The method is in this case characterized in that d) at least one temperature value for the object surface facing the transmission/reception unit is determined, e) at least one value for the transit time of the at least one ultrasonic pulse through the object is determined, and f) at least one temperature value for the object surface facing away from the transmission/reception unit is determined by the at least one temperature value for the object surface facing the transmission/reception unit and by the at least one transit time value.

Use is in this case made of the fact that, on the one hand, the extent of an object, in particular a metallic object, and, on the other hand, the sound velocity in an object, in particular in a metallic object, can change as a function of temperature. Thus, for example, the distance between two opposite surfaces of an object, for example of a wall, can increase or decrease with the temperature, while the sound velocity, as a rule, decreases with a rising temperature and increases with a falling temperature. The transit time of an ultrasonic pulse through the object, the ultrasonic pulse being irradiated into the object and being reflected from the object surface lying opposite the entry surface to the entry surface, thus gives information on the extent of the object and on the sound velocity in the object, so that the temperature of the object can be deduced.

It is advantageous, in particular, if the at least one ultrasonic pulse is transmitted into the object by at least one first sound transducer assigned to the transmission/reception unit and the reflected fraction of the at least one transmitted ultrasonic pulse is received by at least one second sound transducer assigned to the transmission/reception unit. Consequently, for example, the at least one ultrasonic pulse can be transmitted into the object at an angle deviating from the surface normal of the entry surface, in order, in particular, to increase the transit stage of the at least one ultrasonic pulse in the case of surfaces of the wall which lie very close to one another. Moreover, for example, measurement is also possible on objects, of which the object surfaces relevant for measurement are not parallel to one another.

It is also advantageous if, by at least one sound transducer assigned to the transmission/reception unit, both the at least one ultrasonic pulse is transmitted into the object and the reflected fraction of the at least one transmitted ultrasonic pulse is received. Thus, for example, a particularly compact transmission/reception unit can be designed.

Advantageously, the at least one ultrasonic pulse is focused onto the object surface facing away from the transmission/reception unit. Consequently, more exact transit time measurement is possible on account of power bundling and of the higher signal-to-noise ratio achievable thereby.

The measurement device is a measurement device for determining the temperature of an away-facing surface of an object, said device having the following parts, namely
  a) a transmission/reception unit,
  a1) a transmitter to transmit at least one ultrasonic pulse through a surface of the object which faces the transmission/reception unit into the object, and
  a2) a receiver to receive at least one fraction, reflected on an object surface facing away from the transmission/reception unit, of the at least one ultrasonic pulse to be transmitted.

The measurement device is in this case characterized by
  b) a temperature unit to determine at least one temperature value for the object surface facing the transmission/reception unit, and
  c) an evaluation unit comprising
  c1) a determination unit to determine at least one value for the transit time of the at least one ultrasonic pulse through the object, and
  c2) an assignment unit to assign the at least one temperature value for the object surface facing the transmission/reception unit and of the at least one transit time value to at least one temperature value for the object surface facing away from the transmission/reception unit.

The advantages explained above for the method are afforded in the proposed measurement device according to the invention.

It is advantageous, in particular, if the temperature unit to determine the at least one temperature value for the object surface facing the at least one transmission/reception unit is at least one thermocouple. A thermocouple makes available a reliable, cost-effective and easily obtainable way for the temperature determination of the irradiation surface.

In this case, it is advantageous that the measurement device has at least one first sound transducer, for transmitting the at least one ultrasonic pulse into the object and a sound transducer, for receiving the at least one ultrasonic pulse reflected from the object surface facing away from the transmission/reception unit. The transmission/reception unit can consequently be operated in what is known as a pitch-catch mode.

It is also advantageous that the measurement device has one sound transducer, both for transmitting the at least one ultrasonic pulse into the object and for receiving the at least one ultrasonic pulse reflected from the object surface facing away from the transmission/reception unit. The transmission/reception unit can consequently be operated in what is known as a pulse-echo mode.

It proves advantageous that the transmission/reception unit has an acoustic waveguide arranged between the sound transducer and object. The respective ultrasonic transducers can consequently be positioned at some distance in order to avoid destruction due, for example, to high temperatures of the object.

It is advantageous that the at least one ultrasonic pulse can be focused onto the object surface facing away from the transmission/reception unit. This makes it possible, for example, to have a more exact determination of the transit time of the at least one ultrasonic pulse through the object.

The proposed method and apparatus provide, furthermore, the use of the method for the temperature determination of an object surface in a turbomachine, in particular a gas or steam turbine, the object being a wall, in particular a flow duct wall, of the turbomachine. The method allows contactless temperature measurement of the fluid, in particular gaseous fluid, flowing through the turbomachine, since the wall surface which is in contact with the fluid assumes in a good approximation the temperature of the fluid.

Moreover, the proposed method and apparatus provide the use of the measurement device for the temperature determination of an object surface on a turbomachine, in particular a gas or steam turbine, the object being a wall, in particular a flow duct wall, of the turbomachine. When the measurement device is used, the advantages explained above for the use of the method are afforded.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENT

Figure 1:
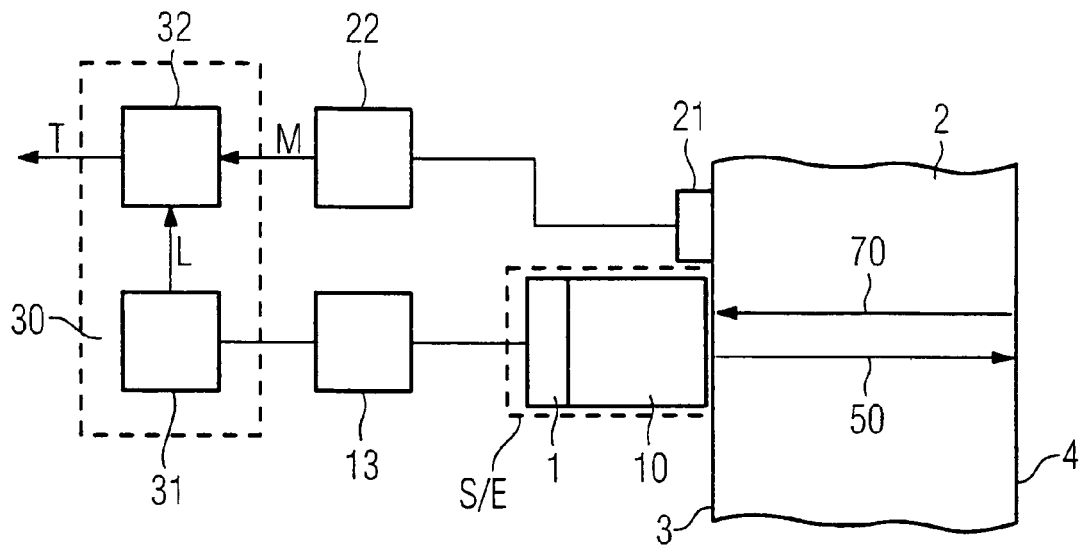
FIG. 1 shows a measurement arrangement with an ultrasonic transducer.

Reference will now be made in detail to the preferred embodiments, examples of which are illustrated in the accompanying drawings, wherein like reference numerals refer to like elements throughout.

Figure 2:
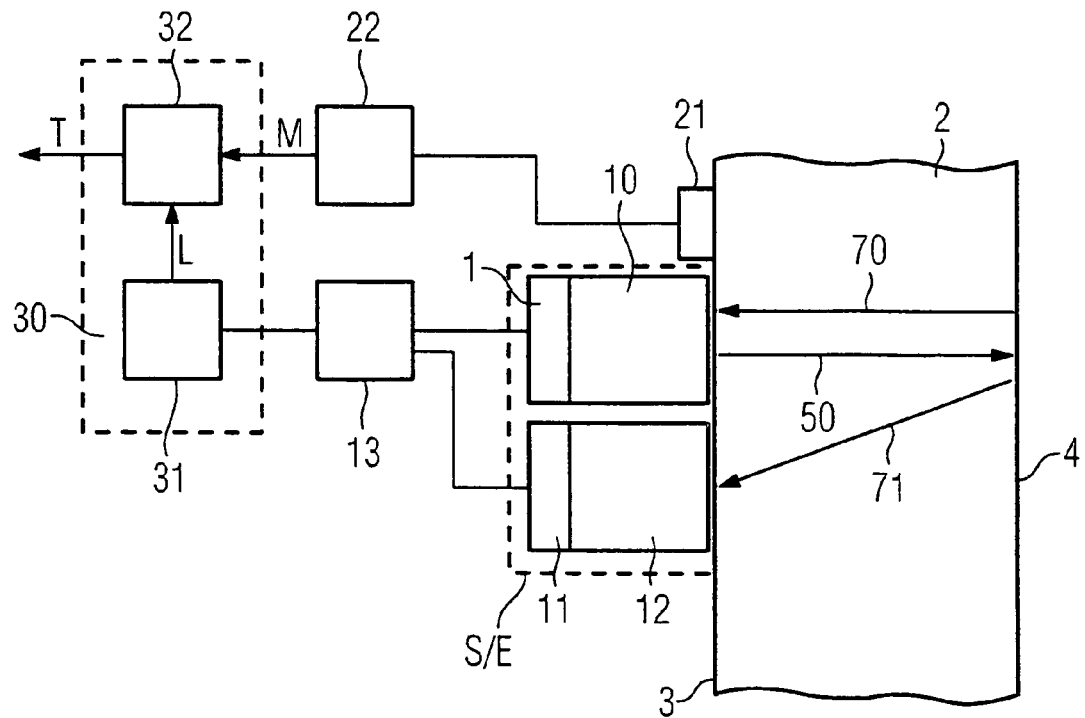
FIG. 2 shows a measurement arrangement with two ultrasonic transducers.
Figure 3:
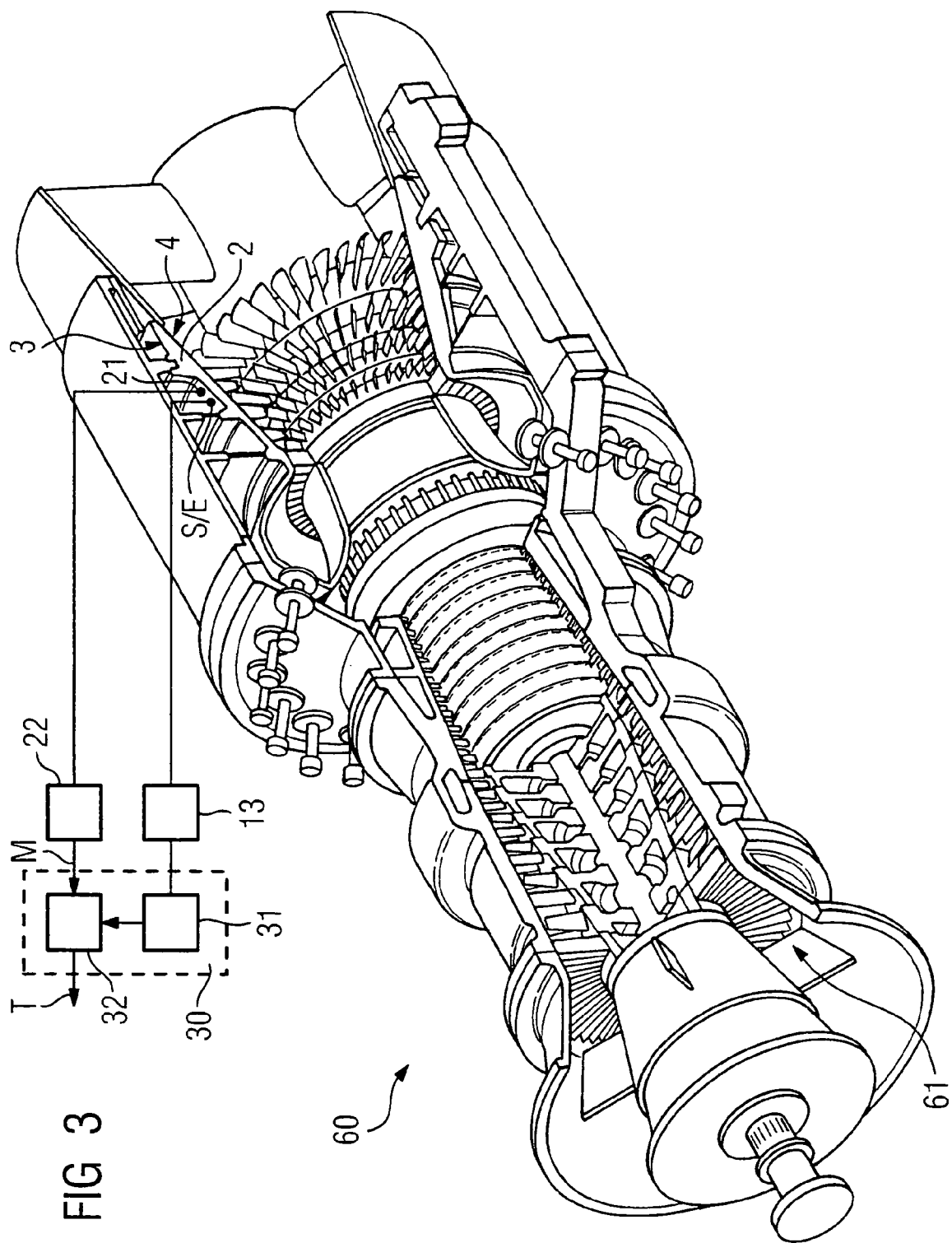
FIG. 3 shows a gas turbine of the related art in a partially cutaway perspective view.

Parts corresponding to one another are given the same reference symbols in FIGS. 1 to 3.

FIG. 1 illustrates a measurement arrangement with a transmission/reception unit S/E which comprises, as unit 1 for the transmission and reception of ultrasonic beams 50, 70, an ultrasonic transducer, in particular in the form of a piezoelectric or magnetostrictive transducer system. Reference is made, in this respect, to the literature reference: "Physik und Technik des Ultraschalls", ["Physics and Technology of Ultrasound"] H. Kuttruff, S. Hirzel, Verlag Stuttgart, 1988, pages 132 to 137. Activated by a control unit 13 via electrical signals, at least one ultrasonic pulse 50 is transmitted from the transmission/reception unit S/E into an object 2, which, for example, may also be coated, in the direction of the object surface 4 facing away from the transmission/reception unit S/E. On the surface 4 or at least in a near-surface region of the surface 4, the at least one ultrasonic pulse 50 is at least partially reflected, so that the reflected fraction 70 of the transmitted at least one ultrasonic pulse 50 is detected by the transmission/reception unit S/E. During detection, the acoustic signal 70 received is converted into an electrical signal by the ultrasonic transducer 1. In this case, the ultrasonic transducer 1 assigned to the transmission/reception unit S/E may be mounted directly on the object surface 3 facing the transmission/reception unit S/E or else, as indicated in FIG. 1, may be in contact with the object surface 3 by an acoustic waveguide 10. A focusing of the at least one ultrasonic pulse 50 onto the object surface 4 facing away from the transmission/reception unit S/E in this case promotes efficiency during reflection and subsequent detection in an advantageous way.

Depending on the distance between the two object surfaces 3, 4, which may be in a range of 1 mm to 500 mm, the frequency of the at least one ultrasonic pulse 50, 70 is established in a frequency range of 1 MHz to 50 MHz.

With the aid of a unit 21 for temperature determination, in particular a thermocouple, at least one value M for the temperature of the object surface 3 facing the transmission/reception unit S/E is determined. For this purpose, the means 21 for temperature determination is mounted on the object surface 3 in the immediate vicinity of the transmission/reception unit S/E. The unit 21 for temperature determination is in this case controlled and interrogated by a control unit 22 assigned to the unit 21 for temperature determination. The control unit 22 is connected to an evaluation unit 30, to which the at least one determined temperature value M of the object surface 3 is transferred from the control unit 22. It is also conceivable to arrange a plurality of unit 21 for temperature determination around the transmission/reception unit S/E, in order to compensate local temperature deviations on the object surface 3.

The control unit 13 assigned to the transmission/reception unit S/E is likewise connected to the evaluation unit 30. In a first evaluation step, at least one value L for the transit time of the at least one ultrasonic pulse 50, 70 through the object 2 is determined. For this purpose, the evaluation unit 30 comprises corresponding unit 31 for determining the at least one transit time value L. The transit time may be determined, for example, in that the time difference between the corresponding input edges or the corresponding first zero crossings of the at least one transmitted ultra-sonic pulse 50 and of the reflected and detected ultrasonic pulse fraction 70 is assigned a corresponding value L. However, the transit time may also be determined by the known cross correlation method, in which the transmitted ultrasonic pulse 50 is correlated with the received ultrasonic pulse fraction 70 by the cross correlation function. This makes it possible to determine directly a value L for the transit time of the ultrasonic pulse 50, 70 through the object 2. Neither method for transit time determination requires any linear amplitude intensification of the ultrasonic pulse fraction 70 received, and the corresponding signal amplifiers, which are assigned, for example, to the control unit 13 assigned to transmission/reception unit S/E, can be adapted to optimal amplification with respect to interference resistance.

The transit time of the at least one ultrasonic pulse 50, 70 is a measure of the sound velocity in the object 2 which is dependent on the temperature and also a measure of the distance between the two object surfaces 3, 4. The transit time, therefore, in conjunction with the thermal expansion of the object 2, is an integral reproduction of the temperature distribution and of the heat flow in the object 2.

In the next evaluation step, at least one temperature value T for the object surface 4 facing away from the transmission/reception unit S/E is determined by the at least one transit time value L and the at least one temperature value M of the object surface 3 facing the transmission/reception unit S/E. This takes place by an assignment unit 32 assigned to the evaluation unit 30, in that the at least one transit time value L and the at least one temperature value M of the object surface 3 are compared with values in a table and are assigned to a temperature for the object surface 4 facing away from the transmission/reception unit S/E. The value table in this case contains, in particular, different combinations of temperature values M, T and transit time values L which are assigned to the two object surfaces 3 and 4 and which have previously been measured in objects of the same material and with comparable dimensions, in particular with a comparable distance between the two object surfaces relevant for measurement.

By the at least one temperature value M of the object surface 3 facing the transmission/reception unit S/E and with the knowledge of the thermal conductivity of the object 2 to be investigated, it is possible, even in the case of different known distances between the two object surfaces 3 and 4 relevant for measurement, to extrapolate the temperature of the object surface 4 facing away from the transmission/reception unit S/E.

The temperature T, determined according to the proposed method, for the object surface 4 facing away from the transmission/reception unit S/E is communicated to a monitoring station or transferred to a central office via indicator or signaling units, not illustrated in any more detail.

The evaluation unit 30 may also be equipped with a comparison function, by which the undershooting or overshooting of a predeterminable temperature threshold value can be detected. Thus, for example, in the case of the undershooting or overshooting of the threshold value, a communication can be output automatically, in order to initiate a suitable protective measure, such as, for example, the shutdown of a turbomachine or the switch-on of additional cooling measures in a power station.

FIG. 2 illustrates a measurement arrangement with a transmission/reception unit S/E which comprises two ultrasonic transducers as units (1, 11) for transmission and/or reception. In FIG. 2, 11 designates a further ultrasonic transducer,
71 an ultrasonic pulse or an ultrasonic pulse fraction and
12 a further acoustic waveguide.

Depending on the nature and geometry of the object 2, an ultrasonic pulse 50 transmitted by the first ultrasonic transducer 1 may be partially reflected back to this or else also be deflected on the reflecting object surface 4 in such a way that the reflected ultrasonic pulse fraction 71 is detected more effectively by a second ultrasonic transducer 11.

If the object surface 3 facing the transmission/reception unit S/E has an increased temperature which, for example in gas turbines 60 (see FIG. 3), may lie in the region of a few 100° C., then, in all the exemplary embodiments described above according to the two FIGS. 1 and 2, there is the possibility that the respective ultrasonic transducer 1, 11 has to be positioned at some distance in order to avoid its destruction. In this case, the ultrasonic pulse 50 generated by the ultrasonic transducer 1, 11 may be coupled into the object 2 and decoupled out of the object 2 with the aid of an acoustic waveguide 10, 12 (active waveguide).

Both exemplary embodiments described above according to FIGS. 1 and 2 are suitable for temperature measurements in which the object surface 4 facing away from the transmission/reception unit S/E has a temperature of more than 1000° C. In particular, the exemplary embodiments are suitable for the temperature measurement of a fluid stream in a turbomachine 60, in particular a gas or steam turbine. FIG. 3 illustrates such a turbomachine 60 as a gas turbine of the related art which is designed for a high gas inlet temperature of approximately 1200° C. The gas turbine 60 has a flow duct 61 through which hot gas flows. The flow duct 61 is surrounded by a wall 2, on the outer surface 3 of which the transmission/reception unit S/E of the measurement device is, for example, arranged. According to the method, therefore, the temperature of the inner surface 4 of the flow duct wall 2 and consequently the temperature of the gas which is in contact with the inner surface 4 of the flow duct wall 4 can be determined through the flow duct wall 2.

The method and the device can be used, in general, for all measurement devices in which temperature measurement through an object 2, in particular through a wall, is advantageous, so that a leadthrough through the object 2, in particular through the wall, may be dispensed with. Mention may be made here, for example, of pressure pipes in power plants or compressed-air reservoirs or casting molds.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A gas or steam turbine comprising:
   a flow duct;
   a flow duct wall having inner and outer surfaces, the flow duct wall surrounding and defining the flow duct; and
   a measurement device, comprising:
      a transmission/reception unit comprising:
         a transmitter to transmit an ultrasonic pulse through the outer surface of the flow duct wall which faces the transmission/reception unit, the ultrasonic pulse being transmitted into the flow duct wall; and
         a receiver to receive a reflected fraction, that was generated from the ultrasonic pulse reflecting from the inner surface of the flow duct wall, the inner surface facing away from the transmission/reception unit;
      a temperature unit to determine a temperature for the outer surface of the flow duct wall; and
      an evaluation unit comprising:
         a determination unit to determine a transit time of the ultrasonic pulse through the flow duct wall; and
         an assignment unit to assign a temperature to the inner surface of the flow duct wall based on the temperature for the outer surface of the flow duct wall and the transit time, wherein
      the transmission/reception unit comprises at least one sound transducer, and
      at least one acoustic waveguide is positioned between the at least one sound transducer and the flow duct wall to separate the transmission/reception unit from the flow duct wall.

2. The turbine as claimed in claim 1, wherein a single sound transducer both transmits the ultrasonic pulse into the flow duct wall and receives the reflected fraction.

3. The turbine as claimed in claim 1, wherein the ultrasonic pulse is focused onto the inner surface of the flow duct wall.

4. The turbine as claimed in claim 1, wherein a first sound transducer transmits the ultrasonic pulse into the flow duct wall and, a second sound transducer receives the reflected fraction.

5. The turbine as claimed in claim 4, wherein
   a first acoustic waveguide is positioned between the first sound transducer and the flow duct wall, and
   a second acoustic waveguide is positioned between the second sound transducer and the flow duct wall.

6. The turbine device as claimed in claim 1, wherein temperature unit is a thermocouple.

7. The turbine as claimed in claim 6, wherein a first sound transducer transmits the ultrasonic pulse into the flow duct wall and a second sound transducer receives the reflected fraction.

8. The turbine as claimed in claim 6, wherein a single sound transducer, both transmits the ultrasonic pulse into the flow duct wall and receives the reflected fraction.

9. The turbine as claimed in claim 8, wherein the ultrasonic pulse is focused onto the inner surface of the flow duct wall.

* * * * *